United States Patent
Oh

(10) Patent No.: US 6,633,606 B1
(45) Date of Patent: Oct. 14, 2003

(54) BLIND CHANNEL EQUALIZER

(75) Inventor: Ji-sung Oh, Seongnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/449,616

(22) Filed: Nov. 30, 1999

(30) Foreign Application Priority Data

Mar. 27, 1999 (KR) ............................................ 99-10694

(51) Int. Cl.$^7$ ................................................ H03H 7/30
(52) U.S. Cl. ...................................... 375/229; 375/232
(58) Field of Search ................................. 375/229, 232, 375/230, 350, 321, 316; 708/322, 323; 329/357; 333/28 R; 455/47; 348/725

(56) References Cited

U.S. PATENT DOCUMENTS 5,537,439 A * 7/1996 Choi ........................... 375/232
6,418,164 B1 * 7/2002 Endres et al. ............... 375/232

* cited by examiner

*Primary Examiner*—Khai Tran
(74) *Attorney, Agent, or Firm*—Sughrue Mion, PLLC

(57) ABSTRACT

A blind channel equalizer for deciding a blind coefficient of a channel equalizer for use in a digital television signal processor. The blind channel equalizer in a vestigial sideband (VSB) receiving system includes a comparator for determining a boundary level value according to the distribution of occurrence probabilities of VSB symbol levels and comparing the determined boundary level value with a received symbol, a blind decision coefficient allocator for allocating one of three blind coefficients according to an output result of the comparator, and a subtracter for performing subtraction with respect to the received symbol and an output of the blind decision coefficient allocator to provide a blind error. Inverse transformation is not necessary during the blind channel equalization, thereby simplifying the hardware structure. In addition, National Television System Committee (NTSC) interference signals can be prevented so that the performance of channel equalization can be improved.

5 Claims, 2 Drawing Sheets

BLIND CHANNEL EQUALIZER

BACKGROUND OF THE INVENTION

1. Field of the Invention

The present invention relates to a signal processing apparatus for a digital television, and more particularly, to a blind channel equalizer for determining a blind coefficient of a channel equalizer. This application is based on Korean Application No. 99-10694 which is incorporated herein by reference.

2. Description of the Related Art

In a digital television using ground waves, broadcasting signals are transmitted from a transmitter to a receiver. The transmitted signals travel from the transmitter to the receiver along different routes, and are time-delayed by obstacles along the different routes. Accordingly, even if the same signals are transmitted from the transmitter, the signals arrive at the receiver at different times. For that reason, channel equalization is required. Channel equalization is a method of summing up all received signals and recovering original signals in the receiver.

A digital television employing the same broadcasting mode as the existing National Television System Committee (NTSC) analog television may be interfered with by an NTSC signal. To prevent deterioration of reception performance resulting from such interference, a digital television receiver includes an NTSC rejection filter (NRF).

Generally, a blind error used in a self-recovering channel equalizer can be calculated as follows.

$$e_{blind}(i) = \gamma \text{sgn}(y) - y(i) \quad (1)$$

where a blind error at a particular time i is equal to a value obtained by subtracting an output y(i) of a feed forward filter 100 described below at the particular time i from a value obtained by multiplying a blind decision coefficient y by a sign function sgn(y). At this time, the blind decision coefficient y with respect to a transmission symbol string $\{x\}$ can be calculated as follows.

$$\gamma = \frac{E[x^2]}{E[|x|]} \quad (2)$$

The blind decision coefficient is 5.25 at an 8-vestigial sideband (VSB), 8 at a 15-VSB, and 10.625 at a 16-VSB on the basis of a level value.

For blind channel equalization, the transmission symbol string should have a constant value or have a value in a sub-Gaussian distribution. In the case of the 15-VSB which has passed through a comb filter, outputs of a channel equalizer have a triangular distribution, theoretically limiting the application of blind channel equalization. According to conventional technology, an output symbol string is approximated to a binary sequence of $+\gamma$ and $-\gamma$ to calculate an error signal. When symbol values converge on a level value 0 as in the 15-VSB, a blind error is measured using inverse transformation and then the measured blind error is forward transformed to obtain a desired value.

FIG. 1 is a block diagram of a conventional blind channel equalizer. A NRF output signal which has passed through the feed forward filter 100 is delayed by 12 symbols in an inverse transformer 110 before being output. A blind decision coefficient allocator 120 allocates a blind decision coefficient $+\gamma$ or $-\gamma$ to a resultant of the inverse transformation. A forward transformer 130 forward-transforms a blind decision coefficient signal. The forward transformer 130 outputs a blind decision coefficient corresponding to a 15-VSB level. A subtracter 140 performs subtraction with respect to the blind decision coefficient from the forward transformer 130 and the signal from the feed forward filter 100 to obtain a blind error value.

In such method, a transmission symbol string is inverse-transformed and its distribution is made uniform. Thereafter, a blind decision coefficient is obtained and passed through a partial response system, thereby obtaining a blind error in the form of a partial response. When this blind error is applied to the 15-VSB passed through the comb filter, the blind decision coefficient becomes either +10.5 or −10.5.

The blind error can be obtained in a usual partial response system. However, in the 15-VSB introduced to remove NTSC interference signals, NTSC components are restored during the inverse transformation and cause errors during the process of measuring the blind error. Specifically, the blind error is determined in accordance with a sign of a receiving symbol. When inverse transformation is performed in the 15-VSB, the NTSC components are restored and cause the sign of the receiving symbol to be disturbed. This phenomenon appears particularly when the level value of a symbol is small.

SUMMARY OF THE INVENTION

It is an object of the present invention to provide a blind channel equalizer for allocating a blind decision coefficient to improve the performance of a self-recovering channel equalizer for a system having a partial response.

To achieve the object of the present invention, there is provided a blind channel equalizer in a vestigial sideband (VSB) receiving system. The blind channel equalizer includes: a comparator for determining a boundary level value according to the distribution of occurrence probabilities of VSB symbol levels and comparing the determined boundary level value with a received symbol; a blind decision coefficient allocator for allocating one of three blind coefficients according to the output result of the comparator; and a subtracter for performing subtraction with respect to the received symbol and an output of the blind decision coefficient allocator to provide a blind error.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

The present invention will now be described in greater detail with reference to the accompanying drawings, in which a preferred embodiment of the invention is shown.

Figure 1:
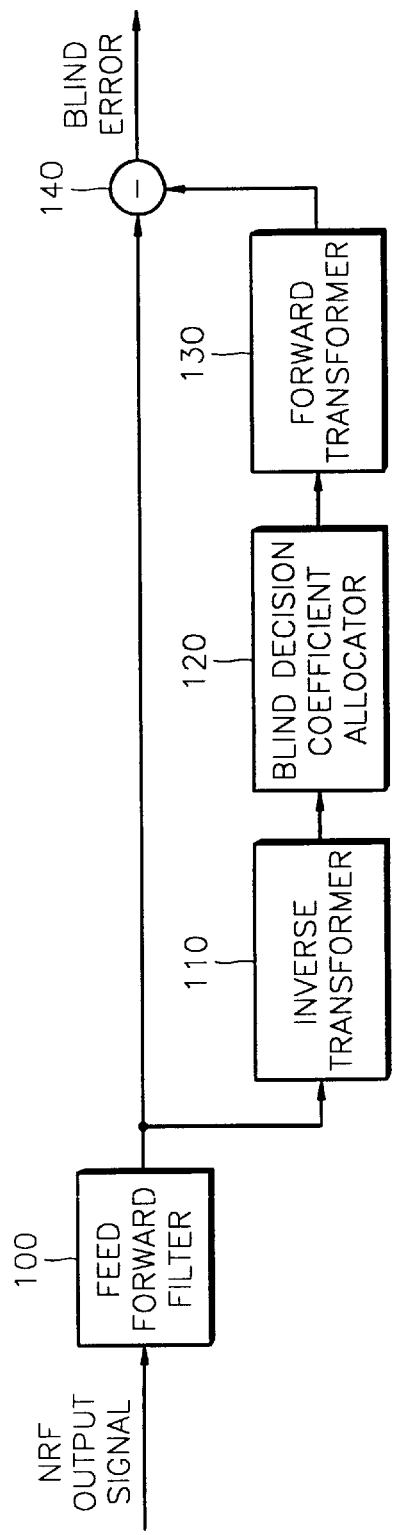
FIG. 1 is a block diagram of a conventional blind channel equalizer.
Figure 2:
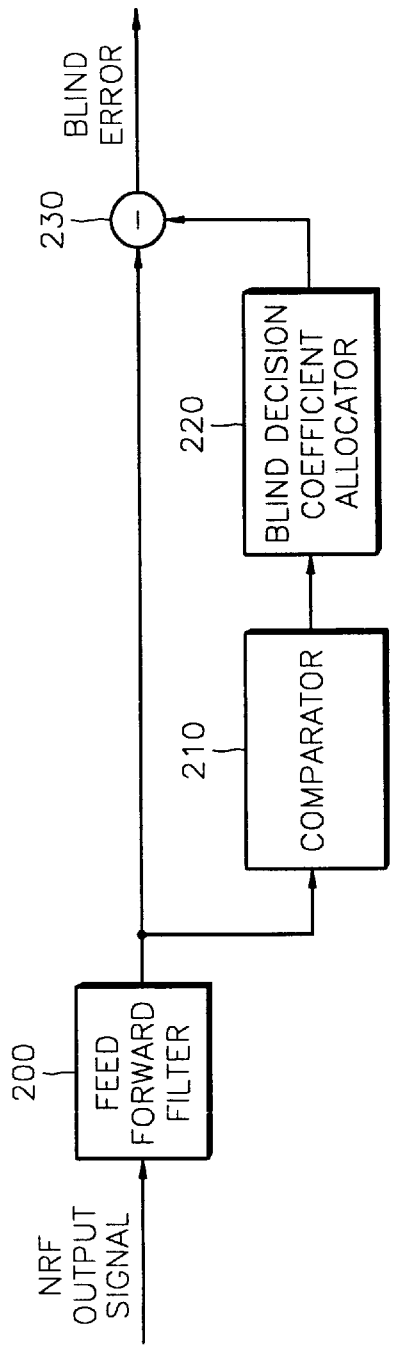
FIG. 2 is a block diagram of a blind channel equalizer according to the present invention.

FIG. 2 is a block diagram of a blind channel equalizer according to the present invention. The blind channel equalizer of FIG. 2 comprises: a feed forward filter 200 for feed forward filtering a National Television System Committee (NTSC) rejection filter (NRF) output signal; a comparator 210 for comparing the NRF signal filtered by the feed forward filter 200 with a boundary level value; a blind decision coefficient allocator 220 for allocating a blind decision coefficient according to the resultant from the comparator 210; and a subtracter 230 for performing subtraction with respect to the feed forward filtered signal and a signal allocated the blind decision coefficient to provide a blind error.

Figure 3:
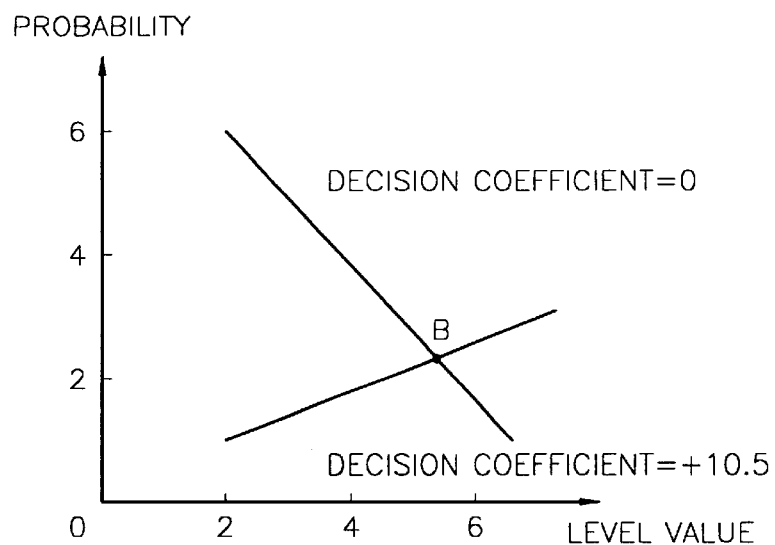
FIG. 3 is a graph showing the decision of a boundary level value at a comparator depicted in FIG. 2.
Figure 4:
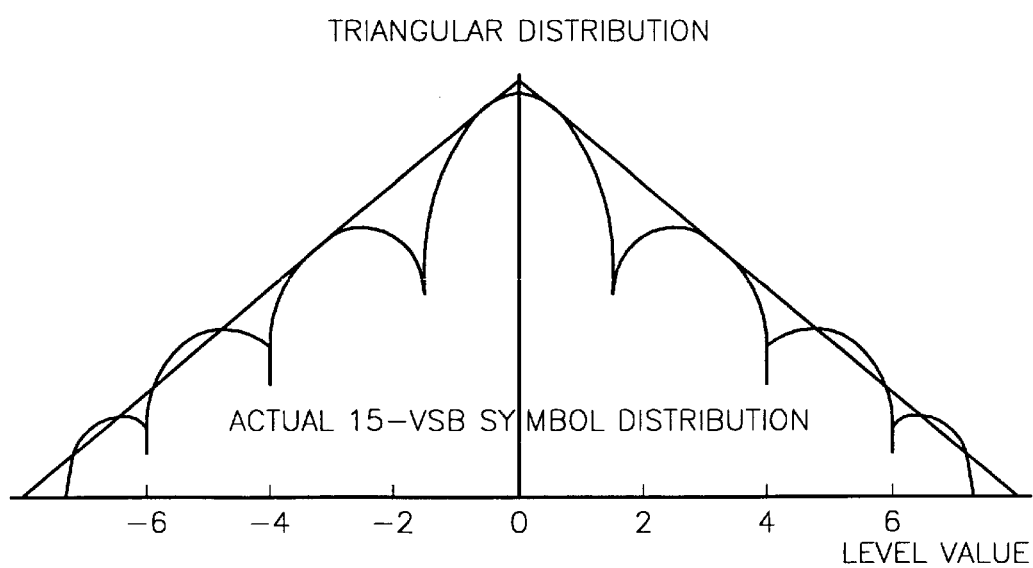
FIG. 4 is a graph showing a continuous probability distribution of 15-vestigial sideband receiving values.

FIG. 3 is a graph showing the decision of a boundary level value at the comparator depicted in FIG. 2. FIG. 4 is a graph showing a continuous probability distribution of 15-vestigial sideband (VSB) receiving values. With reference to FIGS. 2 through 4, the present invention will be described in more detail.

To obtain a blind error without influence of NTSC signals, a blind decision coefficient should be directly calculated in a 15-VSB mode without inverse transformation. When applying conventional art to the 15-VSB, since distribution of a symbol string is not uniform, a proper decision coefficient cannot be obtained. To overcome this problem, the present invention uses three blind decision coefficients instead of two blind decision coefficients. Specifically, instead of allocating one of two blind decision coefficients according to a sign of a receiving value, the comparator 210 compares a current receiving value with two specific values B and −B and then the blind decision coefficient allocator 220 allocates one of three blind decision coefficients +10.5, 0 and −10.5 to a channel equalizer output according to the result of the comparison.

When considering the method which is applied to a partial response system in an ideal channel, a blind decision coefficient is allocated according to the current value of an inverse transformation output and the sign of a 12-symbol delayed value in the 15-VSB as follows.

TABLE 1

| Blind decision coefficient | Sign of current output | Sign of 12-symbol delayed output |
|---|---|---|
| +10.5 | + | − |
| 0 | + | + |
|   | − | − |
| −10.5 | − | + |

The following table shows blind decision coefficients and probabilities of a particular blind decision coefficient being allocated to each symbol of the 15-VSB.

According to Table 2, it is reasonable for +10.5 to be allocated as the blind decision coefficient when the 15-VSB symbol level value is +8 or more, for −10.5 to be allocated as the blind decision coefficient when the 15-VSB symbol level value is −8 or less, and for 0 to be allocated as the blind decision coefficient when the level value is close to 0. However, since the blind decision coefficient is allocated without the inverse transformation, there is a problem in allocating the blind decision coefficient in the symbol level region (±6~±2) where two blind decision coefficients overlaps each other.

When an output value of the channel equalizer is in this region, an accurate blind decision coefficient corresponding to the output value cannot be obtained without the inverse transformation. Accordingly, in such case, the blind decision coefficient should be estimated based on probabilities. In other words, a decision coefficient value which is determined to have a higher probability based on occurrence probabilities between a symbol level and decision coefficients is allocated as the blind decision coefficient.

When the probabilities of values between the levels are interpolated based on the probabilities shown in Table 2, the result is as shown in FIG. 3. When the boundary level value B at which two decision coefficients have the same occurrence probability is calculated, the resulting value is about 5.33. Accordingly, the comparator 210 compares an absolute value of the symbol level from the feed forward filter 200 with 5.33 and then the blind decision coefficient allocator 220 allocates a blind decision coefficient according to the result from the comparator 210. In other words, when the absolute value of the symbol level exceeds 5.33, either +10.5 or −10.5 is allocated as the decision coefficient value. When the absolute value is smaller than 5.33, 0 is allocated as the decision coefficient value. Finally, the subtracter 230 performs subtraction with respect to the feed forward filtered symbol and a symbol allocated the blind decision coefficient to provide a blind error as an output.

Meanwhile, when calculating the boundary level value, it should be assumed that a symbol distribution of the 15-VSB is a continuous distribution in the form of a triangle as shown in FIG. 4. In fact, rectified level values of the 15-VSB have a discrete distribution in the form of a triangle but boundary level values between the rectified level values have continuous Gaussian distribution around the rectified level values. Taking this fact into account, it is realized that the boundary level value should be smaller than 5.33 and, under this condition, the performance of channel equalization is excellent.

According to the present invention as described above, the inverse transformation is not necessary during the blind channel equalization, thereby simplifying the hardware

TABLE 2

| Decision coefficient | −10.5 | | | | | | | | +10.5 | | | | | | |
|---|---|---|---|---|---|---|---|---|---|---|---|---|---|---|---|
| Probability | 1/64 | 2/64 | 3/64 | 4/64 | 3/64 | 2/64 | 1/64 | | 1/64 | 2/64 | 3/64 | 4/64 | 3/64 | 2/64 | 1/64 |
| Symbol level | −14 | −12 | −10 | −8 | −6 | −4 | −2 | 0 | 2 | 4 | 6 | 8 | 10 | 12 | 14 |
| Probability | | | | | 2/64 | 4/64 | 6/64 | 8/64 | 6/64 | 4/64 | 2/64 | | | | |
| Central value | | | | | | | | 0 | | | | | | | | structure. In addition, NTSC interference signals can be prevented so that performance of channel equalization can be improved.

While this invention has been particularly shown and described with reference to the preferred embodiment thereof, it will be understood by those skilled in the art that various changes in form and details may be made therein without departing from the spirit and scope of the invention as defined by the appended claims.

What is claimed is:

1. A blind channel equalizer in a vestigial sideband (VSB) receiving system, the equalizer comprising:

a comparator for determining a boundary level value according to the distribution of occurrence probabilities of VSB symbol levels and comparing the determined boundary level value with a received symbol;

a blind decision coefficient allocator for allocating one of three blind coefficients according to an output result of the comparator; and a subtracter for performing subtraction with respect to the received symbol and an output of the blind decision coefficient allocator to provide a blind error.

2. The equalizer of claim 1, wherein the coefficient allocator allocates one of three blind coefficients +10.5, 0 and −10.5 according to the VSB symbol levels.

3. The equalizer of claim 2, wherein the coefficient allocator allocates either +10.5 or −10.5 when the output of the comparator indicates that an absolute value of the received symbol exceeds the determined boundary level value and the coefficient allocator allocates 0 when the output of the comparator indicates that the absolute value of the received symbol is smaller than the determined boundary level value.

4. The equalizer of claim 1, wherein the blind channel equalizer is applied to a channel equalizer employing a partial response in a data transmit-receive system.

5. The equalizer of claim 1, wherein the determined boundary value is calculated by assuming that the distribution of occurrence probabilities of VSB symbol levels is a continuous distribution of a 15-VSB having a triangular form.

\* \* \* \* \*